United States Patent [19]

Smith

[11] Patent Number: 4,713,929
[45] Date of Patent: Dec. 22, 1987

[54] HARVESTING OF AQUATIC VEGETATION BY HELICOPTERS

[75] Inventor: Robert W. Smith, Alva, Fla.
[73] Assignee: Colony Services Inc., LaBelle, Fla.
[21] Appl. No.: 23,713
[22] Filed: Mar. 9, 1987
[51] Int. Cl.⁴ .............................................. A01D 44/00
[52] U.S. Cl. ...................................... 56/8; 56/DIG. 2
[58] Field of Search .............................. 56/8, 9, DIG. 2

[56] References Cited

U.S. PATENT DOCUMENTS

| 2,684,549 | 7/1954 | Olden | 56/8 |
| 3,877,208 | 4/1975 | Wesemann | 56/328 R |
| 4,248,033 | 2/1981 | Bryant | 56/9 |
| 4,275,545 | 6/1981 | Pace | 56/8 |
| 4,416,106 | 11/1983 | Hawk | 56/DIG. 2 |
| 4,422,284 | 12/1983 | Fandrich et al. | 56/328 R |
| 4,520,616 | 6/1985 | Stewart et al. | 56/8 |
| 4,554,781 | 11/1985 | Rogers | 56/235 |

FOREIGN PATENT DOCUMENTS 1084277  8/1970  Canada ............................ 56/328 R Primary Examiner—Paul J. Hirsch
Attorney, Agent, or Firm—Alfred E. Wilson

[57] ABSTRACT

In the operation of certain agricultural and industrial pursuits an excess of various chemicals results. For example, an excess of phosphorus results from the use of fertilizers in the general farming operations of stimulate the growing of grass in the dairy rich areas of central Florida. This excess quantity of phosphorus finds its way into the streams and rivers, and contaminates any of the streams and bodies of water that receive the outflow of these chemically rich waters. For example, the Kissimmee River flows through the dairy rich lands of central Florida and contaminates Lake Okeechobee into which they flow. Many other chemicals used as lubricants and additives in industrial operations that also are discharged into the various bodies of water are harmful to the fish and aquatic plants whose presence is necessary to recycle and purify the water. The purification of many of the bodies of water such as Lake Okeechobee is of major importance because it is relied on as the supplier of fresh water by large areas for domestic and farming purposes. Fortunately Hyacinths, a bulbous plant of the lily family thrives on excessive phosphorus. They grow rapidly and by the time they approach maturity they have absorbed virtually all of the phosphorus of which they are capable. Therefore, to rid the water of excess phosphorus, the Hyacinth plants are being harvested and removed from the waters to make room for the next crop of Hyacinths. The Hyacinth is virtually a surface growing plant, the entire bed being only approximately two to three feet in depth. Difficulties have been encountered in harvesting the Hyacinths by floating equipment, due to the difficulties in unloading the harvesting equipment. It has been found that Hyacinths can economically and rapidly be harvested by helicopters by dragging large buckets through concentrated Hyacinth areas to compact the Hyacinths in the bucket. When the container is filled to capacity the helicopter flies away to the unloading area where the bucket is upended to discharge the Hyacinths whereupon the helicopter quickly flies back to get the next load.

6 Claims, 4 Drawing Figures

HARVESTING OF AQUATIC VEGETATION BY HELICOPTERS

BACKGROUND OF THE INVENTION

Heretofore difficulties have been encountered in the removal of hyacinths from the waters, primarily because the hyacinths grow in such mat-like interwoven masses that they block off and virtually prevent boat travel. They grow in such concentrated masses that to harvest them by floating harvesters is not feasable because of the time spent unloading the harvesting equipment, even if the hyacinths are compacted by bailing equipment.

FIELD OF THE INVENTION

We have found that we can economically and rapidly harvest hyacinths by helicopters. We employ large perforated, light-weight containers formed for example of aluminum, suspended approximately 20 to 50 feet beneath the helicopter, and having suitable controls whereby the pilot can accurately position the container to skim along two to three feet beneath the surface of the water to gather the hyacinths in the container to its capacity, the hyacinths being compacted in the container by the impact of the forward movement of the helicopter, the excess water flowing out through the holes in the container. The helicopters can fly forward at the optimum speed that is desirable to insure compacting the hyacinths in the container to the extent desired, and when the container is full the helicopter can raise it out of the water by merely increasing the elevation of the helicopter, or elevating the container relative to the helicopter. The helicopter can then fly quickly to the unloading location, whether it be a transport vehicle to haul the hyacinths away, or to a ground area and discharge them. The unloading operation can be accomplished merely by tilting the container to permit gravity to unload the container while the hleicopter remains in the air. The control of the angular inclination of the container can be controlled by the pilot by the manipulation of suitable controls from him piloting position in the helicopter.

SUMMARY OF THE INVENTION

Briefly summarized a helicopter is employed to pull a light weight open ended container having perforated bottom, sides and back wall through the aquatic plants to force them into the open ended container, and to compact them in the container due to the forward speed of the helicopter. When the container is filled the container is elevated out of the water and the helicopter flies to the point of unloading of the aquatic plants. The container is tipped to the unloading position where the aquatic plants fall out of the bucket whereupon the helicopter flies back to get another load of aquatic plants which are to be moved.

If the aquatic plants to be harvested are of the floating type such as hyacinths it is only necessary to submerge the bottom of the container a sufficient distance to pick up the aquatic plants.

If however the plants being harvested are of the bottom growing plants such as the Hyrdilla and So Niad, or the so-called emergent weeds, it is necessary to have a mower such for example as a chain saw or a sycle type mower can be positioned in the lip of the container. If desired it can be of the straight reciprocating blade type similar to a mowing machine wherein the blade is projected forwardly of the bottom of the container. In that instance the bottom of the container and the blade can be positioned at a suitable depth beneath the surface of the water, it being understood that the deeper the plant is cut beneath the surface of the water the longer it will take for the plant to regrow to again reach the surface of the water.

DESCRIPTION OF THE PREFERRED EMBODIMENT

Figure 1:
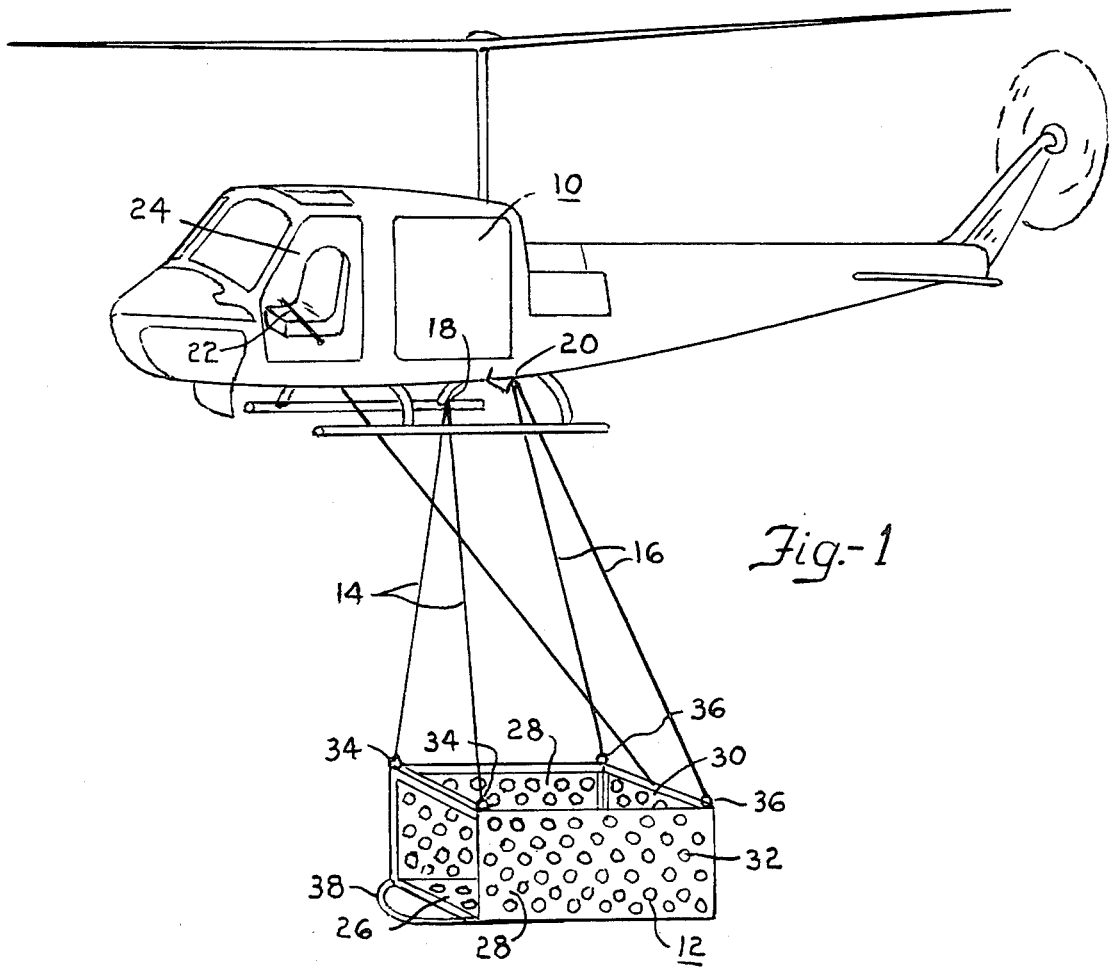
FIG. 1 is a side elevational view of a helicopter with an Aquatic Vegetation Harvesting device in place thereon.

Referring now to FIG. 1, a helicopter 10 is illustrated with an open ended bucket 12 secured by front cables 14 and rear cables 16. The front cables 14 are preferably connected to the helicopter at a stationary point 18 in the helicopter 10, and the rear cables 16 are connected to the helicopter at a point 20 preferably spaced rearwardly of the point 18 so as to insure alignment of the bucket 12 with the helicopter 10. If desired the front cables 14 can be of a specific length and the rear cables 16 can be so mounted that they can be elevated or lowered to vary the angular inclination of the bucket 12 between a substantially horizontally extended harvesting position and a retracted position to elevate the rear end of the bucket 12 to move the bucket to the angularly inclined unloading position. The controls for shortening or lengthening the rear cables 16 can be actuated electrically or hydraulically by the pilot of the helicopter by actuation of a suitable control 22 in the pilots compartment 24.

Figure 2:
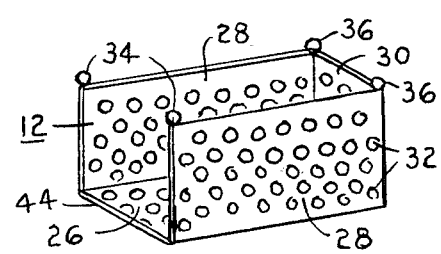
FIG. 2 is a perspective view of the bucket illustrated in FIG. 1.

As more clearly illustrated in FIG. 2 the bucket 12 may be of any desired size commensurate with the lifting capacity of the helicopter 10, and the type of aquatic vegetation being harvested.

The bucket 12 illustrated has for example a bottom 26 that is for example 10 feet long and 6 feet wide. The sides 28 and the back 30 are for example 4 feet high. The bottom 26, sides 28 and back 30 of the bucket 12 have closely spaced holes 32 throughout to permit the rapid escape of water as the bucket 12 is pulled through the water to harvest the aquatic vegetation.

In assembling the bucket 12 to the helicopter 10 the bucket 12 with the front cables 14 operably connected to the front corners 34 of the bucket 12 and the rear cables 16 connected to the rear corners 36 of the bucket 12 are positioned on the ground, preferably in front of the helicopter 10. The helicopter 10 is preferably positioned behind the bucket 12 with the front of the helicopter facing in the same direction as the bucket 12.

The front and rear cables 14 and 16 are preferably of a length ranging from 20 feet to 50 feet long depending on the type of helicopter being employed and the size of the bucket. The front cables 14 are connected to the front stationary point 18 on the bottom of the helicopter, and the rear cables 16 are connected to the rear stationary point 20 on the bottom of the helicopter.

When all is in readiness the engine of the helicopter is started and is accelerated to lift the helicopter. The pilot maneuvers the helicopter to position it above the bucket 12. The ground crew personnel checks the positioning of the cables to be certain that they are all properly aligned and in proper operating condition and that the connections to the bucket and the helicopter are operating correctly.

The helicopter 10 with the bucket 12 in its proper operating position beneath the helicopter is then flown to the area where the aquatic vegetation is to be harvested.

If hyacinths is the plant to be harvested the helicopter maneuvers to position the bucket 12 at the beginning of a run, and varies the elevation of the helicopter to position the bottom 26 of the bucket approximately two to three feet beneath the surface of the water or the hyacinth bed. The forward speed of the helicopter forces the hyacinths into the bucket 12, the water flowing out through the holes 32 in the bottom, sides and back 26, 28 and 30 of the bucket 12. The forward speed of the helicopter 10 will compact the hyacinths in the bucket 12, and when the bucket 12 is filled to its desired capacity the pilot increases the altitude of the helicopter to a desired traveling height with the loaded bucket. When the unloading area is reached the pilot descends to a desired elevation and then actuates the controls 22 to elevate the rear end of the bucket to discharge the compacted hyacinths from the bucket 12 to fail by gravity to the disposal area. The pilot then readjusts the elevation of the bucket 12 and flies back to get another load.

Figure 4:
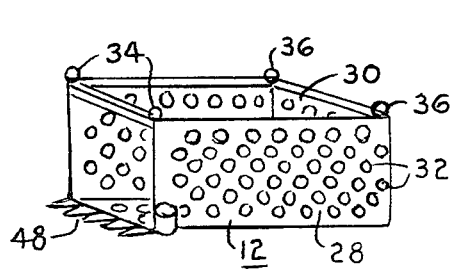
FIG. 4 is a view similar to FIG. 3 wherein a straight across reciprocating blade is provided at the entrance to the hopper.
Figure 3:
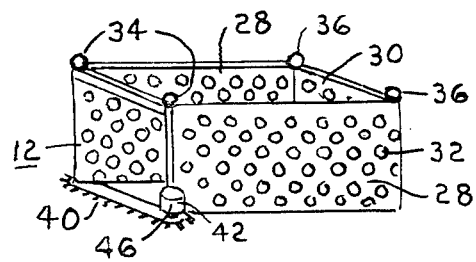
FIG. 3 is a fragmentary perspective view of the embodiment of the invention wherein a mower of the chain saw type is provided at the open end of the bucket.

In instances where the aquatic plants that have roots in the bottom of the water are to be harvested, a bucket, as illustrated in FIG. 3 or 4 having a blade 42 at the forward end of the bottom 26 of the bucket rather than the bumper rail 38 as illustrated in FIG. 1. The pilot maneuvers the helicopter to position the bottom 26 of the bucket 12 at the elevation where it is desired to cut the stalks of the growing plants. The blade 42 is then actuated to cut the stalks of the aquatic plants to be harvested. As soon as the stalks are cut by the blade 42 the forward movement of the bucket 12 in the water compacts the aquatic plants in the bucket. When the bucket is filled with compacted aquatic planes the pilot elevates the helicopter to pull the bucket out of the water and he then flies to the unloading station where the unloading procedures are as previously described.

In FIG. 3 a chain saw type mower 40, driven by a motor 42 is secured to the container 12. Suitable controls for actuating the chain saw motor 42 include for example a pump 46 actuated by suitable controls in the pilot's compartment 24 of the helicopter 10 to enable the pilot to control the actuation of the chain saw 40 to cut the stalks of the water plants at whatever depth in the water that is desired.

FIG. 4 illustrates a modified form of mower such as the side sickle blade type mower 48 actuated by a hydraulic pump 50 controlled by suitable controls from the pilot's compartment 24.

In instances where the Aquatic harvester is used to clear out the growth in a canal the cables connected to the aquatic harvesting container are sufficiently long that the helicopter can fly above the trees with the container suspended at the desired depth beneath the surface of the water.

In certain instances it may be desirable to use a clam shell type bucket to clear out concentrated areas of aquatic vegetation. Attention is directed to the fact that this type of bucket may be used if desired, the closing and opening of the clam shell bucket being controlled by suitable mechanisms actuated by the pilot.

I claim:

1. The method of harvesting aquatic vegetation by helicopter which comprises the steps of: (1) providing a container having an open front and bottom, sides and back walls, a series of apertures in the walls to permit the escape of water; (2) suspending the container beneath a helicopter; (3) providing controls to vary the angular relation of the container between a position where the bottom of the container is substantially horizontal in a loading position and a forwardly tilted angular position to an unloading position to permit gravity to dischage the harvested aquatic vegetation from the container; (4) flying the helicopter over a patch of aquatic vegetation with the bottom of the container in a substantially horizontal position submerged to a desired depth to harvest the aquatic vegetation and with the open front of the bucket in alignment with aquatic vegetation to induce the vegetation to flow into the container and to be compacted therein by the forward speed of the helicopter; (5) increasing the elevation of the container to withdraw the container from the water; (6) flying the helicopter to an aquatic vegetation unloading area; and (7) tilting the container angularly forwardly to the unloading position to permit gravity to unload the container.

2. The invention defined in claim 1 wherein the container is formed of light-weight material of an aluminum alloy.

3. The invention defined in claim 1 wherein a cutting blade is positioned at the entrance to the container to cut the stalks of aquatic plants that have roots in the bottom of the water.

4. The invention defined in claim 3 wherein the cutting blade is of the chain saw type.

5. The invention defined in claim 3 wherein the cutting blade is of the sickle blade type.

6. The invention defined in claim 1 wherein the aquatic vegetation being harvested is hyacinths, which is a floating vegetation.

* * * * *